United States Patent [19]

Greil et al.

[11] Patent Number: 5,077,819
[45] Date of Patent: Dec. 31, 1991

[54] HERMETICALLY SEALED OPTICAL FIBER-LENS ARRANGEMENT AND PROCESS FOR THE PRODUCTION OF SUCH ARRANGEMENT

[75] Inventors: Andreas Greil; Franz Taumberger, both of Munich, Fed. Rep. of Germany

[73] Assignee: Siemens Aktiengesellschaft, Berlin and Munich, Fed. Rep. of Germany

[21] Appl. No.: 330,338

[22] Filed: Mar. 29, 1989

[30] Foreign Application Priority Data

Mar. 31, 1988 [DE] Fed. Rep. of Germany ....... 3810938

[51] Int. Cl.⁵ ................................................. G02B 6/36
[52] U.S. Cl. .......................................... 385/79; 385/35
[58] Field of Search ............... 350/96.18, 96.15, 96.17, 350/96.20; 250/227, 552; 357/17, 19, 30, 74, 8

[56] References Cited

U.S. PATENT DOCUMENTS

| 4,119,363 | 10/1978 | Camlibel et al. | 250/552 X |
| 4,707,067 | 11/1987 | Haberland et al. | 350/96.20 |
| 4,726,648 | 2/1988 | Haberland et al. | 350/96.20 |
| 4,824,202 | 4/1989 | Ayras | 350/96.20 X |

FOREIGN PATENT DOCUMENTS 0191328 8/1986 European Pat. Off. .
0238977 9/1987 European Pat. Off. .

OTHER PUBLICATIONS

Pat. Abst. of Japan, vol. 6, No. 212, 10/26/82, Appl. No. 57-118212.
Pat. Abst. of Japan, vol. 7, No. 2, 1/7/83, Appl. No. 57-161818.
Pat. Abst. of Japan, vol. 10, No. 74, 3/25/86, Appl. No. 60-212712.
Pat. Abst. of Japan, vol. 10, No. 169, 6/14/86, Appl. No. 61-20912.

Primary Examiner—John D. Lee
Assistant Examiner—Phan T. Heartney
Attorney, Agent, or Firm—Eugene S. Indyk

[57] ABSTRACT

A hermetically sealed optical fiber lens arrangement, particularly for optoelectronic modules, includes an optical fiber which extends through a metal tubule and is fastened therein. The metal tubule is attached through a flange at an aperture in a wall of a module housing, and includes a spherical lens fastened in the module housing. The metal tubule supporting the optical fiber is adjusted in the flange by axially displacing it a preset focal distance from the spherical lens, and is fastened in the flange. The spherical lens mounting takes the form of a metal tubule and is adjusted at the frontal side of the flange adjacent to the housing by transverse displacement and fastened, so as to achieve optimum alignment of the optical axes of said arrangement, and the flange is hermetically sealed directly or through an annular projection of the spherical lens mounting to the modular housing wall.

13 Claims, 2 Drawing Sheets

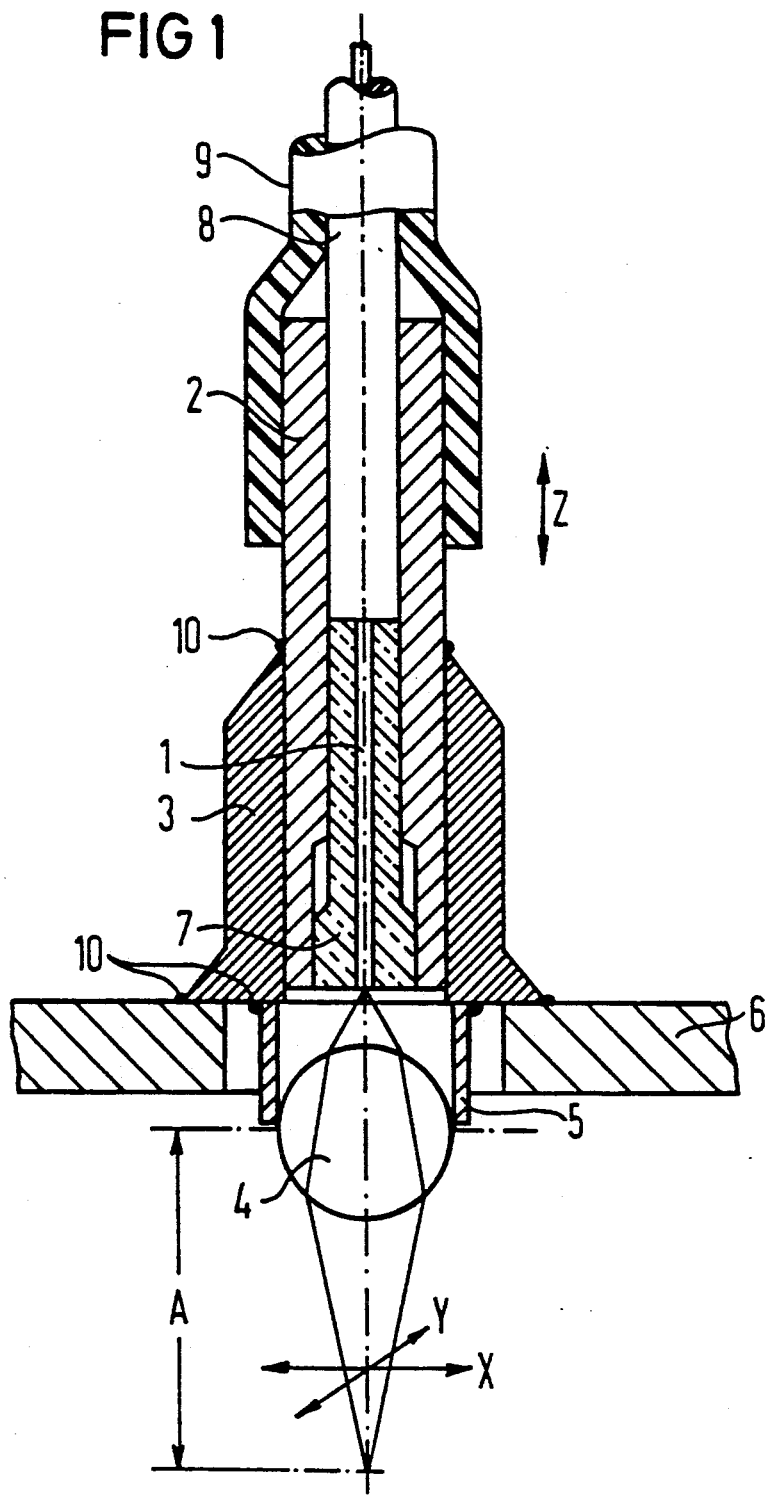

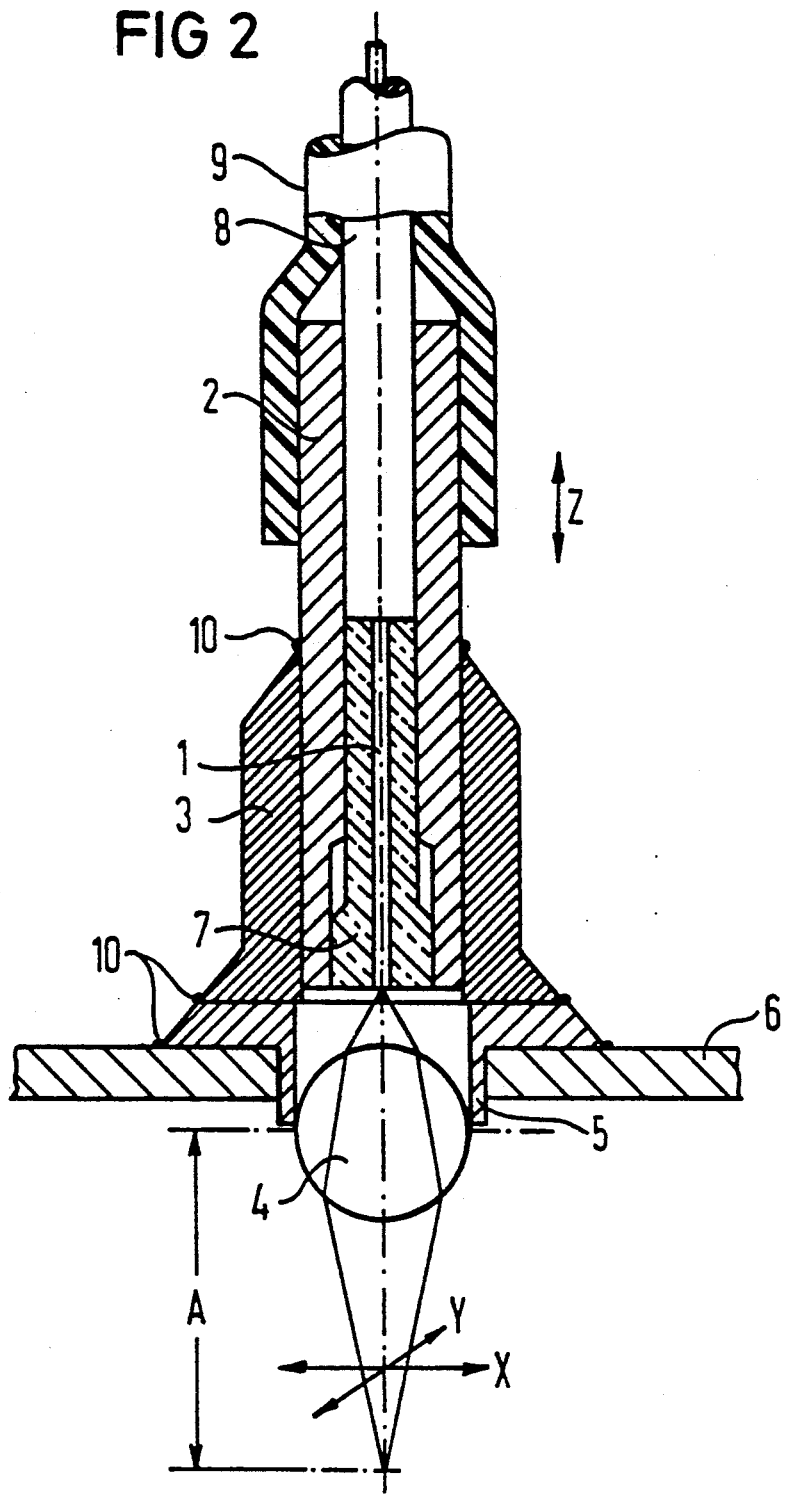

HERMETICALLY SEALED OPTICAL FIBER-LENS ARRANGEMENT AND PROCESS FOR THE PRODUCTION OF SUCH ARRANGEMENT

BACKGROUND OF THE INVENTION

This invention relates to a hermetically sealed optical fiber-lens arrangement particularly for optoelectronic modules. Furthermore, this invention relates to a process for the production of such arrangement.

The coupling of an optoelectronic component in a monomode or multimode fiber, or the coupling of the monomode or multimode fiber to an optoelectronic component is, as is generally known, obtained through free-beam optics i.e. by projecting an optical beam in a module including at least one optical lens. At the same time, a hermetically sealed optical waveguide bushing, which passes through the wall of the module housing, is required for the protection of the component and corresponding optics.

In the case of a receiver module, the optical fiber, e.g., is fastened with its blunt end facing an optoelectronic component. In the case of a transmitting module, it is attached with a microlens (taper) also in front of an optoelectronic component. It must be hermetically sealed in the housing bushing.

In an optical waveguide transmitting or receiver system, it is generally known to use optical lenses, particularly in the form of spherical lenses for coupling the light, which is either emitted by or is received from the optoelectronic semiconductor component into or from an optical waveguide, preferably in the form of a glass fiber.

In this connection, the following difficulties may arise: The lens is required to be mounted in a precisely defined position in the light path between the active semiconductor component and the optical waveguide within a tolerance of 1μ. The lens must be easily adjustable for optimum coupling between the waveguide and the optoelectronic component. Furthermore, the active semiconductor chip must not be impaired by the lens mount, e.g., as a result of mechanical stress.

Various lens fastening methods are currently in use or have until now been used in conventional coupling configurations. In one approach, an optical lens is formed directly on a semiconductor chip. In another approach an optical lens is cemented directly on a semiconductor chip. A third technique is to mount a semiconductor chip directly in a housing with lens cap.

All of these configurations or fastening techniques, however, have a major disadvantage in that there is no defined spacing between the semiconductor chip or the optoelectronic component and the optical lens that is capable of adjustment so that large tolerances must be accepted.

SUMMARY OF THE INVENTION

It is an object of the present invention to avoid the disadvantages of the foregoing described optical fiber-lens arrangements by providing an arrangement which makes possible a simple, precise adjustment while fixing the focal position of the lens to maintain optimal alignment along an optical axis common to the lens and the fiber. It is a further object to provide a hermetically sealed arrangement particularly suitable for application in optoelectronic modules.

The foregoing objects are achieved by means of a hermetically sealed optical fiber-lens arrangement in which a lens is optically coupled to an optical fiber which is contained and held in a tubule. A flange for holding the tubule is attached over an aperture in the wall of a module housing and the tubule is fastened therein after being axially displaced to a preset focal distance from the lens. A mounting for supporting the lens, is mounted to a front side of the flange adjacent to the module housing after transverse displacement for optimal alignment of the optical axes of the arrangement.

Furthermore, this object is achieved by a process in which an optical fiber is contained and held in a tubule and the tubule is inserted in a flange. Then the tubule is adjusted in the flange along a direction corresponding to a first axis for setting a focal distance from a lens and the tubule is fastened and hermetically sealed connected to the flange. Afterwards a mounting supporting the lens in directions of a second and a third axis is adjusted by displacing the mounting transversely to the flange, while correcting the squint of the arrangement in a direction of its optical axes, and finally the mounting supporting the lens is fastened to the flange.

As a practical matter, the adjustment and the assembly of the arrangement according to the invention should proceed as follows:

After a relatively thick-walled metal tubule has been glazed on the optical fiber, the metal tubule is inserted into a flange and is adjusted with respect to the spherical lens which, in turn, is glazed or cemented in a spherical lens mounting. By adjusting along the z-axis, the focal distance A to the principal plane of the spherical lens is established and fixed, preferably by means of a laser weld joint between the flange and the metal tubule. These components are then hermetically sealed by welding. Subsequently, the adjustments in the x-axis and the y-axis are performed by displacing the spherical lens mounting in the transverse or lateral direction from the z-axis running through the center of the tubule with respect to the orientation of the flange, while, at the same time enabling the misalignment or squint of the fiber-lens arrangement to the optical axis to be corrected to ±0.5°. Then, the spherical lens mounting is fastened to the flange by means of several laser weld points or spot welds. Before proceeding with the process, the fiber-lens configuration can be tested for correct focal position, small squint angles, as well as for functionality. The efficiency of the modular design is thus increased considerably. The rejection of critical and expensive components can thus be avoided.

At this point, the optical fiber lens arrangement can on the other hand be adjusted roughly along the x-y-axes to an optical transmitting and/or receiver module and fastened with laser welding points. Subsequently, the flange will be hermetically sealed to the module housing wall by welding. The materials used for this process must be suitable for laser welding.

The hermetic sealing is applied to the joints between the fiber and metal tubule; the metal tubule and flange; and the flange and housing wall.

A second assembly is produced in accordance with the above-mentioned process, with the exception that now the hermetic seal is applied at joints between the spherical lens and spherical lens mounting and the spherical lens mounting and housing wall. As a result, it is no longer necessary for the optical fiber to be hermetically glazed into the metal tubule; it can be cemented into the tubule.

The advantages obtained by this invention particularly relate to the fact that a pretested optical fiber-lens arrangement is adjusted and fastened to an optical transmitting and/or receiver module. The focal position as well as the squint angle of this configuration can be adjusted with precision. The lens can be adjusted to the optical fiber in directions corresponding to x-y-z-axes, wherein the adjustment of the lens along the axes (x and y axes) oriented transverse to the optical fiber is particularly advantageous. In addition, the optical waveguide bushing is hermetically sealed. It is also possible to mount an optical fiber connector coupling instead of a metal tubule. By dereflecting the spherical lens, the coupling efficiency can still be increased, thus preventing reflection. Finally, the adjustment in the submicrometer range ($0.1\mu$) in front of the optoelectronic component, e.g., the laser diode, is mechanically uncoupled by the housing bushing.

BRIEF DESCRIPTION OF THE DRAWINGS

Additional features of the invention and additional objects of the invention will be more readily appreciated and better understood by reference to the following detailed description which should be considered in conjunction with the drawings, in which identical components are indicated in the Figures by corresponding reference numeral designations.

FIG. 1 illustrates a cross-section of an optical fiber-lens arrangement according to the invention, and FIG. 2 illustrates a further cross-section of an optical fiber-lens arrangement according to the invention.

DETAILED DESCRIPTION OF THE DRAWINGS

The optical-fiber lens arrangement illustrated in FIG. 1 and 2 basically include an optical fiber 1 located in a metal tube 2. The bare optical fiber 1, which has been stripped of its coating 8, is fastened in the metal tubule 2. In the examples shown, the fastening is hermetically sealed, i.e., it is in the form of a pressure glazing 7. For this purpose, the metal tubule 2 is formed to have relatively thick walls, and the inside diameter of this tubule is enlarged at its extremity adjacent to a housing. The metal tubule 2 is attached through a flange 3 to an aperture of a wall 6 of the module housing. Joints 10 between flange 3 and the tubule 2 and the wall 6 are hermetically sealed, these seals may be preferably provided by laser welds. To prevent kinking, a shrinkdown hose 9 is pressed down upon the outer end of the metal tubule 2, which tightly encloses the section of the optical fiber 1 (rigid core), which is provided with a coating 8. The metal tubule 2 with its optical fiber 1 is adjusted, within the flange 3, to a spherical lens 4 (focal length) at a preset focal distance A, then fastened to the flange. This adjustment is obtained by moving it axially, i.e., in the direction of the z-axis indicated by an arrow. The fastening is done, preferably by laser welding, at the weld seams or joints 10 which extends form the extremity of the flange 3 to the metal tubule 2. The mount 5 for the spherical lens 4, which is made of a metal tubule, and which is preferably developed as a pressure mount, is adjusted at the frontal side of the flange 3 adjacent to the housing by transverse displacement, so as to achieve optimal alignment of the optical axes of the arrangement; subsequently it is fastened to the flange 3. The transverse displacement takes place in the direction of axes x and y (space dimensions) indicated in the figures by crossed arrows. The fastening of the spherical lens mounting 5 on the frontal side of the flange 3 facing the housing is again realized as a laser weld joint 10; however, spot welding would be adequate in this example. The flange 3, with the adjusted components of the arrangement, as shown in the exemplified embodiment of FIG. 1, is directly and hermetically sealed to the module housing wall 6 by means of a laser weld seam 10.

In another illustrative embodiment shown in FIG. 2, the assembly is almost identical with the embodiment of FIG. 1, and it is produced by the same method. The only difference is that in this arrangement, the hermetic seal is situated at joints between the spherical lens 4 and the spherical lens mounting 5, and the spherical lens mounting 5 and the module housing wall 6. For this purpose, the metal tubule of the mounting 5 of the spherical lens 4 is provided with an annular projection at the flange end of said metal tubule. The hermetically sealed joints 10 are formed by laser weld seams at the edges between the flange 3 and the projection of the spherical lens mounting 5, as well as the projection of the spherical lens mounting 5 and the module housing wall 6. This embodiment, in particular, offers the advantage of it being no longer necessary for the optical fiber 1 to be glazed hermetically into the metal tubule 2, so that this fiber may for example, be suitably attached by cementing.

There has thus been shown and described a novel mounting for a spherical lens which fulfills all the objects and advantages sought therefor. Many changes, modifications, variations and other uses and applications of the subject invention, will, however, become apparent to those skilled in the art after considering the specification and accompanying drawings which disclose illustrative embodiments thereof. All such changes, modifications, variations and other uses and applications which do not depart from the spirit and scope of the invention are deemed to be covered by the invention which is limited only by the claims which follow.

We claim:

1. An apparatus for coupling an optical fiber to a lens, comprising:
    a metal tubule containing an optical fiber having an optical axis;
    a module housing including a wall having an aperture;
    a flange for holding the metal tubule, the flange being situated over the aperture; and
    a mounting supporting a lens having an optical axis, the mounting being attached to a frontal surface of the flange through the aperture;
    the flange permitting axial displacement of the optical fiber to a present focal distance from the lens; and
    the housing, mounting, and flange permitting transverse displacement of the lens to align the optical axis of the lens with respect to the optical axis of the optical fiber.

2. The apparatus of claim 1, in which the lens is a spherical lens.

3. The apparatus of claim 1, further comprising a hermetic seal directly connecting the flange to the wall of the module housing.

4. The apparatus of claim 1, in which the flange is indirectly connected to the module housing by way of being hermetically sealed to an annular projection on the mounting which is hermetically sealed to the module housing.

5. The apparatus of claim 4, in which the hermetic seals are laser welds.

6. The apparatus of claim 1, further comprising:
a first hermetic seal between the tubule and the flange;
a second hermetic seal between the flange and the module housing; and
a third hermetic seal between the flange and the mounting.

7. The apparatus of claim 1, further comprising:
a first hermetic seal between the optical fiber and metal tubule;
a second hermetic seal between the metal tubule and the flange; and
a third hermetic seal between the flange and the wall of the module housing.

8. The apparatus of claim 7, in which the first, second, and third hermetic seals are laser welds.

9. The apparatus of claim 1, in which the mounting supporting the lens comprises a second metal tubule.

10. The apparatus of claim 9, in which the second metal tubule has an annular projection hermetically sealed to the module housing; and
in which the lens is hermetically sealed to the second metal tubule.

11. A process for coupling an optical fiber to a lens, comprising the steps of:
inserting an optical fiber contained in a metal tubule into a flange;
adjusting the metal tubule in the flange along a first axis in a direction corresponding to setting the focal distance of the optical fiber from the lens;
hermetically sealing the metal tubule to the flange after adjusting the metal tubule in the flange;
adjusting a mounting supporting a lens in directions along second and third axes transverse to the first axis by displacing the mounting transversely with respect to a frontal surface of the flange; and
fastening the mounting to the frontal surface of the flange after the step of adjusting the mounting.

12. The process of claim 11, in which the lens is a spherical lens.

13. The process of claim 11, in which sealing and fastening steps are laser welding steps.

* * * * *